Jan. 30, 1945.   G. A. LYON   2,368,248
WHEEL STRUCTURE
Filed July 12, 1943
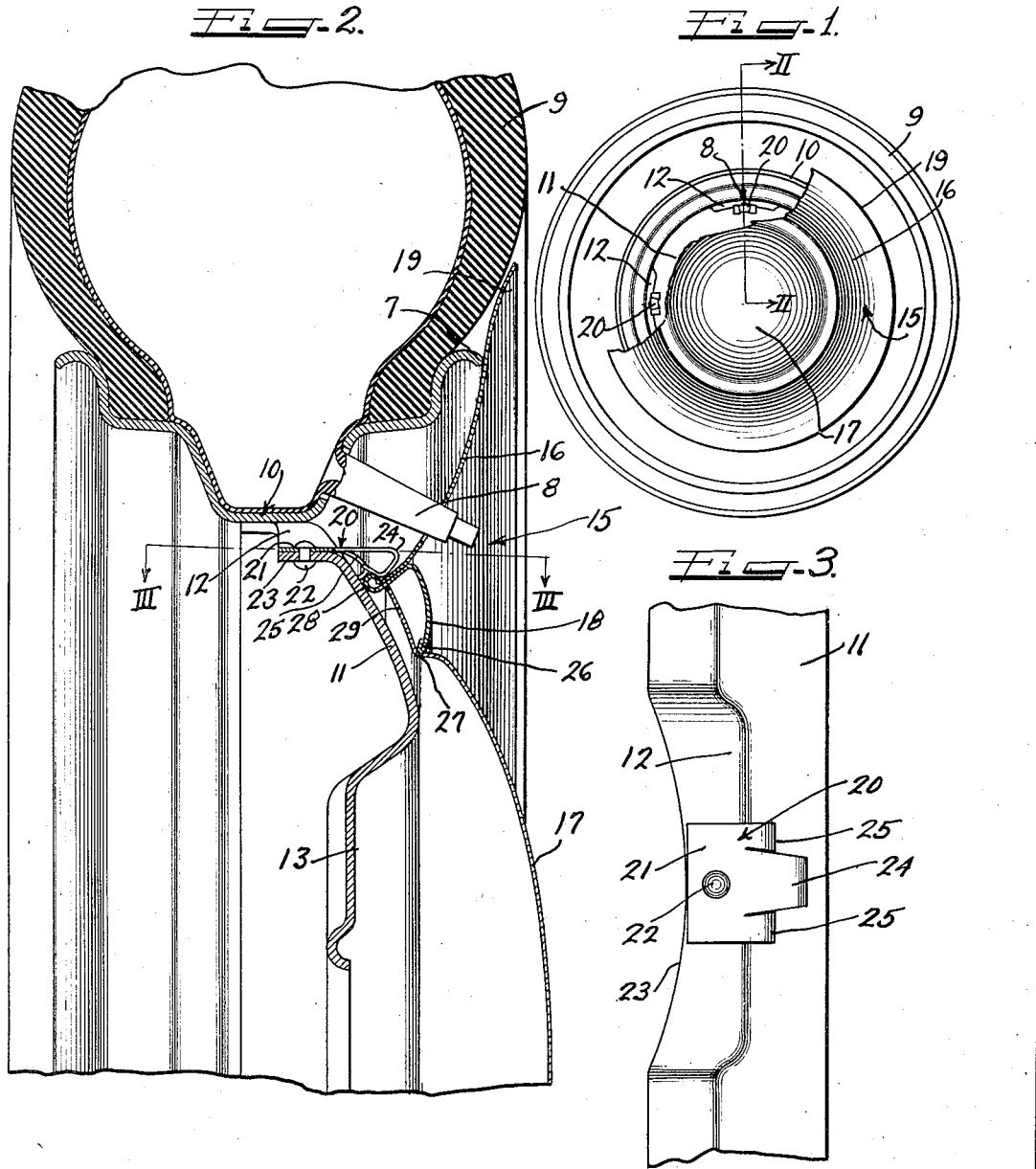
Inventor
GEORGE ALBERT LYON.
by Charles W. Hills Attys.

Patented Jan. 30, 1945

2,368,248

UNITED STATES PATENT OFFICE 2,368,248

WHEEL STRUCTURE

George Albert Lyon, Allenhurst, N. J.

Application July 12, 1943, Serial No. 494,305

9 Claims. (Cl. 301—37)

This invention relates to a wheel structure and more particularly to a novel cover and retaining means therefor.

An object of this invention is to provide a highly ornamental and simplified form of wheel cover which is rigidified at its point of application to the wheel and which is provided with novel retaining means on the wheel.

Another object of this invention is to provide an improved spring clip for retaining a wheel cover on a wheel and which includes means for centering the cover as well as for acting as a stop in the use of the clip.

In accordance with the general features of this invention there is provided in a wheel structure including wheel trim and body parts a multi-part wheel cover for disposition over a side of the wheel, including an outer trim ring section, a hub cap section and an intermediate ring for joining said sections together and providing a rearwardly extending annular shoulder, and a plurality of spring clips on the wheel for retaining engagement with the cover shoulder, each of the clips defining a seat for the cover shoulder and also having a resilient finger for pressing the cover shoulder against the seat and the wheel, and including an under-turned or looped portion over which the shoulder is adapted to be cammed upon axial movement of the cover home into retained position.

Another feature of the invention relates to the provision of a plurality of multi-part cover sections joined together in such a way that the sections cannot be removed without removing the cover from the wheel, and the joint being of such character that it cooperates readily with spring clips mounted on the wheel in the retention of the cover on the wheel.

Other objects and features of this invention will more fully appear from the following detail description taken in connection with the accompanying drawing which illustrates a single embodiment thereof and in which Figure 1 is a side view of a wheel structure embodying the features of this invention and partly broken away to show the position of the spring clips;

Figure 2 is an enlarged fragmentary cross-sectional view taken on the line II—II of Figure 1 looking in the direction indicated by the arrows and showing the manner in which the multi-part cover is retained on the cover by the spring clips; and Figure 3 is a detail view taken on the line III—III of Figure 2 broken away at the ends of the view and showing clearly the configuration of the spring clip.

As shown on the drawing:

The reference character 9 designates generally a pneumatic tire having the usual inner tube provided with the usual valve stem 8. The tire has its beads mounted in the conventional drop-center multi-flange tire rim 10 attached at spaced intervals to a wheel body part or spider 11 leaving openings 12 between the points of attachment of the spider to the base flange of the rim. The wheel body part 11 includes the usual dished center bolt-on flange 13 by means of which the wheel may be mounted in a detachable manner on a support or axle as is well known in the art.

Cooperable with an outer side of the wheel and embodying the features of this invention is a multi-part wheel cover designated generally by the reference character 15 and which is illustrated as embracing a plurality of sections including an outer annular trim ring section 16, a central hub cap section 17, and an intermediate connecting ring 18. I have attained excellent results by making the trim ring section 16 and the hub cap section 17 of a plastic material, such, for example, as a thermal plastic. Good results have been secured by the use of so-called ethyl cellulose. The material used must have sufficient body to it that it will cause the ensuing parts to be self-sustaining with respect to shape and form but yet have the resiliency necessary for their application in the intended use. The resiliency of the material must be such that it will resist permanent deformation of the material but still enable deflection or indenture without buckling or permanently giving the material a different set from its original shape of the parts.

The intermediate ring 18 may be made of any suitable stiff material but I prefer to use metallic sheet material since such material provides the necessary rigidity and also lends itself to a lustrous finish. Obviously by giving the ring 18 a highly lustrous external finish it will add to the appearance of the cover and will cause the cover to have an intermediate lustrous bead which will be set off against the two contrasting areas of the sections 16 and 17.

The outer marginal edge of the ring section 16 is slightly turned outwardly at 19 to provide a lip which is manually engageable to deflect the portion or section 16 bodily away from the wheel whenever it is desired to afford access to the rear of the same for the purpose of prying the cover loose from the wheel. By pulling the ring section away from the wheel it is possible to insert a tool therebehind and in engagement with the shoulder of the cover for the purpose of forcibly ejecting it out of engagement with the retaining means on the wheel. Also it will be perceived that the lip portion 19 extends radially beyond the rim 10 and overlies a portion of the side wall of the tire. By this arrangement it is possible when the ring section 16 is given a light finish, such as a white finish, to cause the ring section to appear to be a part of the side wall of the tire. In actual appearance it will to the on-looker appear to constitute a white-side wall part of the tire in which the white side wall part extends clear down to the ornamental intermediate ring or bead 18.

If a long valve stem 8 is used, such as is shown in Figure 2, the cover ring section 16 may be apertured so as to permit the valve stem 8 to extend therethrough. It will, of course, be understood that if a shorter valve stem is used access may be had to the valve stem by merely flexing the ring section 16 bodily away from the wheel without necessitating removal of the cover. Upon release of the section 16 after it has been thus manually deflected, it will immediately snap back into its original position in which it is in abutting relation to an outer edge of the rim as shown at 7 in Figure 2.

This cover of my invention is adapted to be held on the wheel by means of a plurality of spring clips 20 which are identical in construction. Each spring clip 20 includes a base portion 21 extending into the wheel opening 12 and secured by means of a rivet or the like 22 to a flange 23 of the wheel body 11 which defines one side of the wheel opening 12. The clip also includes axially outwardly extending resilient means in the from of a goose neck spring or finger 24 having an underturned free extremity. The sides of the goose neck spring 24 are relieved as shown in Figure 3 but are provided with radially inwardly turned shorter loops 25—25, the extremities of which are adapted to engage the wheel body as shown in Figure 2 for the purpose of aiding in preventing rotation of the clips. In addition, these inwardly turned portions 25—25 are so arranged as to constitute a seat for the cover shoulder which will now be described in detail.

The outer ring section 16 has an inner edge adapted to be snapped over an underturned outer shoulder on the bead or ring 18 behind a curled edge 28 formed on the outer margin of the ring 18. The inner edge of the ring 18 is formed into a turned edge 26 which is adapted to seat on a shoulder 27 formed on the hub cap section 17, the peripheral margin 29 of the hub cap section being adapted to be sprung over the curled outer edge 28 of the ring 18 into the position shown in Figure 2. In other words, both of the sections 16 and 17 have their adjacent edges sprung from the rear side of the ring 18 onto the same. This arrangement is advantageous in that it precludes removal of the sections from the outer side of the ring 18 inasmuch as these sections are only applicable to the ring 18 from the rear side of the same.

The resilient character of the material used in the ring and hub cap sections 16 and 17 enables these edges to be very readily elastically stretched over the rear cover shoulder 28 provided by the ring 18. Thus the ring 18 not only ornaments the cover but, in addition, provides a means for holding the sections together in a single cover unit, and in addition provides a relatively rigid shoulder 28 which is adapted to stand the force of any pressure employed in camming this annular shoulder 28 over the underturned portions of the spring clip fingers 24.

In the application of the cover, the cover is pressed axially onto the wheel until the annular shoulder 28 is forced over the high spots of the underturned fingers 24, and is in the retained position shown in Figure 2 where it is held home tightly against the wheel body part 11. In the removal of the cover the outer lip portion 19 is manually engaged so as to partly flex the ring section 16 away from the wheel, and thereafter a pry-off tool may be inserted therebehind for the purpose of engaging the shoulder 28 of the cover and prying the cover forcibly free from the retained clips 20.

As mentioned previously, the spaced clip loops 25 serve to center the edge 28 of the cover as the cover is pressed axially home against the wheel and cooperate in defining a seat for the edge 28. In addition, their abutment against the wheel body 11 serves to aid in resisting rotation of each clip relative to the rivet 22.

I claim as my invention:

1. In a wheel structure including wheel rim and body parts, a multi-part wheel cover for disposition over a side of the wheel, including an outer trim ring section, a hub cap section and an intermediate ring for joining said sections together and providing a rearwardly extending annular shoulder for use in the retention of the cover on the wheel, and a plurality of spring clips on said wheel for retaining cooperation with said shoulder, each of said clips having a spring finger defining a seat for receiving and centering said cover shoulder and a resilient finger for pressing said shoulder against said seat and the wheel, including an underturned portion over which said shoulder is adapted to be cammed upon axial movement of the cover home into retained position.

2. In a wheel structure including wheel rim and body parts, a multi-part wheel cover for disposition over a side of the wheel, including an outer trim ring section, a hub cap section and an intermediate ring for joining said sections together and providing a rearwardly extending annular shoulder for use in the retention of the cover on the wheel, and a plurality of spring clips on said wheel for retaining cooperation with said shoulder to hold the cover on the wheel and each including stop means for preventing rotation of the clip and cooperating with the other clips to center said shoulder and act as a means for restricting shifting of the cover on the wheel.

3. In a wheel structure including wheel rim and body parts connected together at spaced areas leaving wheel openings between the spaced areas, a multipart wheel cover for disposition over a side of the wheel including an outer trim ring section, a hub cap section and an intermediate ring for joining said sections together and providing a rearwardly extending annular shoulder, said sections being applied to the ring from the rear side of the same and each being resiliently snapped over a shoulder on said ring whereby said sections and ring are retained together as a unit, and spring clip means mounted on the wheel inside said openings and each including a goose neck extremity over which said rear cover shoulder is adapted to be cammed for retaining the cover on the wheel, each of said clips also including means for engaging the body part adjacent the extremity of the clip to serve as a seat for said rear cover shoulder and also to aid in preventing movement of the clip.

4. In a wheel structure including wheel rim and body parts connected together at spaced areas leaving wheel openings between the spaced areas, a multi-part wheel cover for disposition over a side of the wheel including an outer trim ring section, a hub cap section and an intermediate ring for joining said sections together and providing a rearwardly extending annular shoulder, said sections being applied to the ring from the rear side of the same and each being resiliently snapped over a shoulder on said ring whereby said sections and ring are retained together as a unit, and spring clip means mounted on the wheel inside said openings and each including a goose neck extremity over which said rear cover shoulder is adapted to be cammed for retaining the cover on the wheel, each of said clips also including means for engaging the body part adjacent the extremity of the clip to serve as a seat for said rear cover shoulder and also to aid in preventing movement of the clip, said outer trim ring section being made of a plastic material that is self-sustaining with regard to form and yet resiliently deflectable without permanent deformation whereby the trim ring section may be deflected without removing the cover for the purpose of affording access to the rear side of the trim ring section.

5. In a wheel structure including wheel rim and body parts connected together at spaced areas leaving wheel openings between the spaced areas, a multi-part wheel cover for disposition over a side of the wheel including an outer trim ring section, a hub cap section and an intermediate ring for joining said sections together and providing a rearwardly extending annular shoulder, said sections being applied to the ring from the rear side of the same and each being resiliently snapped over a shoulder on said ring whereby said sections and ring are retained together as a unit, and spring clip means mounted on the wheel inside said openings and each including a goose neck extremity over which said rear cover shoulder is adapted to be cammed for retaining the cover on the wheel, each of said clips also including means for engaging the body part adjacent the extremity of the clip to serve as a seat for said rear cover shoulder and also to aid in preventing movement of the clip, said trim ring section being of such radial depth as to extend outwardly beyond the tire rim part and to overlie the tire and also having such a cross-sectional contour as to appear to be a continuation of the side wall of the tire whereby the tire appears to extend clear down to the intermediate ring.

6. In a wheel structure including wheel rim and body parts, a multi-part wheel cover for the wheel including an outer trim ring section, a hub cap section, and an intermediate ring for joining said sections together and providing a rearwardly extending annular shoulder, and a plurality of spring clips on said wheel for retainingly engaging said shoulder to hold the cover on the wheel and each including stop means for preventing rotation of the clip and cooperating with the other clips to center said shoulder and act as means for restraining shifting of the cover.

7. In a wheel structure including rim and body parts, a wheel trim therefor having a rearwardly projecting edge portion and a plurality of spring clips on one of said wheel parts for retaining engagement with said edge portion to hold the trim on the wheel, each of said clips including a resilient finger for engaging the edge portion, and means projecting alongside the finger for engaging one of said wheel parts to act as a stop in the centering of the edge portion of the trim relative to the clips and wheel.

8. The structure of claim 6 further characterized by at least the outer trim section being made of resiliently flexible but form sustaining plastic material and having an outer margin flexible toward and from the wheel.

9. The structure of claim 7 further characterized by the wheel trim being made of resiliently flexible but form sustaining plastic material and having an outer edge deflectable toward and from the wheel.

GEORGE ALBERT LYON.